United States Patent Office 3,215,662
Patented Nov. 2, 1965

3,215,662
METHOD OF PREPARING CONSOLIDATED ARTICLES
Harold A. Clark, Midland, Mich., assignor to Dow Corning Corporation, Midland, Mich., a corporation of Michigan
No Drawing. Filed Jan. 12, 1961, Ser. No. 82,150
7 Claims. (Cl. 260—37)

This invention relates to the use of toluene insoluble organosilanols and organosiloxanols for preparing consolidated articles.

For many years organopolysiloxane resins have been employed in the preparation of molded articles. Such molded articles have attained wide commercial application.

It has been previously taught in the art that siloxane laminating and molding resins should be prepared by the hydrolysis of hydrolyzable silanes to produce partially condensed siloxanes. This hydroylsis is carried out in the presence of strong acid or alkaline catalysts which promote the condensation of the silicon-bonded hydroxyl groups, thereby increasing the molecular weight of the hydrolyzate. The siloxane hydrolyzates which have heretofore been employed to make laminated and molded articles have been characterized by a silicon-bonded hydroxyl content of less than 6 percent by weight and have been characterized by being insoluble in water but soluble in toluene or other nonpolar solvents.

Because of the condensation which has taken place the molecular aggregation of the siloxane resin is such that the viscosity of usable solutions runs in the neighborhood of 25 cs. or higher. Furthermore, since the resins are insoluble in polar solvents, particularly water, difficulty is encountered in obtaining good impregnation of fillers having highly polar surfaces such as cellulose, mica or glass flakes. Thus, the heretofore employed siloxane molding resins did not give good wetting or impregnation of such materials. This was due both to the nonpolar characteristic of the silicone resin solution and to the relatively high viscosity.

Another disadvantage with heretofore employed siloxane molding resins is the fact that relatively high cure is needed in order to obtain reasonable strength in the laminted or molded articles. The cure temperature required in the absence of a catalyst is in the neighborhood of 200° C. With strong catalyst, the cure can be reduced to about 125° C. However, it is not always desirable to have a strong curing catalyst in the siloxane resin.

Another disadvantage which has been encountered with present siloxane molding resins is the lack of retention of strength at elevated temperatures. Thus, a laminated article having high strength at room temperature would lose 50 percent or or more of the strength when measured at 500° F. This loss of strength is presumably due to the formation during hydrolysis and condensation of low molecular weight cyclic structures, which contain no silicon-bonded hydroxyl. This tendency to form cyclic structures has been enhanced by the fact that the condensation of the silane hydrolyzates had to be carried out in solution in order to prevent gelation prior to use.

It is the object of this invention to provide a method of preparing consolidated articles of improved strength at high temperature. Another object is to provide a method of impregnating fibrous or particulated materials which gives superior wetting of the filler by the siloxane solution. Another object is to provide a method of preparing siloxane molded articles which can be cured at 100° C. or below. Another object is to provide siloxane laminating and molding compositions which do not require the use of organic solvents. Other objects and advantages will be apparent from the following description.

This invention relates to a method of preparing an article of manufacture which comprises (1) contacting a filler with a solution of an organosilicon composition of the group consisting of silanols and siloxanols, which organosilicon composition is in such a state of molecular aggregation that it is insoluble in toluene and in which organosilicon composition there is an average of from .9 to 1.9 silicon bonded hydrocarbon radicals per silicon atom, said radicals being of the group phenyl and aliphatic hydrocarbon radicals of less than 4 carbon atoms, in amount such that the filler picks up at least 1.5 percent by weight organosilicon composition based on the weight of the filler and (2) thereafter curing the organosilicon composition to consolidate the filler into a unitary article.

The novel feature of this invention resides in impregnating the filler with highly hydroxylated organosilicon compounds which are characterized by being insoluble in toluene. The solvent in which the organosilanols and organosiloxanols are dissolved can be water or mixtures of water with water miscible solvents such as methanol, ethanol, isopropanol, dioxane and the like.

The degree of condensation of the impregnate of this invention is quite low so that the viscosity of the impregnating solution is about 4 cs. Because of the low degree of condensation most of the polymerization of the siloxane takes place after it has been applied to the filler and dried. Thus, a majority of the polymerization is carried out in the absence of a solvent thereby reducing to a minimum the formation of undesirable cyclic structures.

The term filler as employed herein includes any fibrous or particulated material. The fillers can be either organic or inorganic in nature and include woven fabrics. Specific examples of fillers which are operative herein are siliceous materials such as silica, asbestos, quartz fibers, glass fibers, glass fabrics, aluminum silicate, aluminum magnesium silicate and diatomaceous earth; inorganic oxides such as alumina, titania and beryllia; metals such as aluminum and other inorganic compounds such as silicon carbide, graphite, boron nitride and titanium carbide. The fillers can also be fibrous or particulated organic materials such as paper, alpha-cellulose, nylon, Orlon, Dacron, fluorocarbon resins or phenolic resins.

The organosilicon composition of this invention can be applied to the filler in any convenient manner such as by dipping, spraying, or brushing. The concentration of the organosilicon compound in the treating solution is not critical. However, for the purpose of this invention it is essential that the filler be impregnated with at least 1.5 percent by weight organosilicon compound based on the weight of the filler. The optimum amount of organosilicon compound will depend upon the ultimate use of the consolidated article. When the purpose of the silicon compound is merely to bond fibers in a mat, then the amount of organosilicon compound can be in the range of from 1.5 to 10 percent. When the purpose is to prepare molded articles having the higest mechanical strength, then the amount of organosilicon compound should be in the order of 20 to 35 percent. When one wishes to bond glass paper it is best to use 50 to 60 percent by weight resin. It should be understood that more than 60 percent by weight resin can be used if desired.

The organosilicon composition of this invention can be prepared in any convenient manner. The best method of preparing these compositions is to mix methoxysilanes of the formula $R_nSi(OMe)_{4-n}$ with more than 1 mol of water per mol of methoxy group in the silane. Preferably the amount of water is 2 to 3 mols of water per mol of methoxy group. The mixture is agitated until a homogeneous solution is obtained. If desired, the solution can then be diluted with water to give the desired concentration of organosilicon compound. Whether diluted or not the homogeneous solution is ready for use to impregnate the filler.

In the above formula R can be any of the hydrocarbon radicals hereinafter defined and $n$ has an average value of from .9 to 1.9 inclusive.

In order to facilitate the hydrolysis of the methoxy silanes, it is desirable to employ a mild hydrolysis catalyst such as an acid like acetic, propionic or the like. In general, it is sufficient to employ about 0.1 percent acid based on the weight of the water.

The compositions of this invention can also be prepared by the hydrolysis of the corresponding acetoxy silanes. In this case it is often desirable to buffer the hydrolyzate solution to reduce the acidity thereof.

The shelf life of the impregnating solution varies depending upon the organosilicon compounds employed and the ambient temperature. It also varies with the ion contamination of the water. For longest shelf life, it is preferable to employ distilled water or water which has been deionized and is free of cations. However, the use of ion free water is not essential to the practice of this invention.

For the purpose of this invention it is essential that the filler be impregnated while the organosilicon composition is still insoluble in toluene. This means that the silicon bonded hydroxyl content of the compositions employed herein is extremely high which together with the low viscosity of solutions indicate that the organosilicon composition is a mixture of silanols and low molecular weight siloxanols. This accounts for the excellent impregnation obtained with such difficultly impregnable materials as mica, flake glass and alpha-cellulose paper.

For the purpose of this invention, the organosiloxanes and silanols should contain an average of from .9 to 1.9 silicon bonded hydrocarbon radicals per silicon. These radicals are attached to the silicon through siliconcarbon linkage and can include phenyl radicals or any aliphatic hydrocarbon radical of less than 4 carbon atoms. Thus the substituents can be methyl, ethyl, propyl, vinyl, or allyl groups. Essentially all of the remaining valences of the silicon atoms are satisfied with OH groups and/or oxygen atoms of SiOSi linkages. The organosilicon compounds may contain some residual hydrolyzable groups such as alkoxy or acyloxy groups.

Specific examples of organosilicon compounds which can be present in the compositions of this invention are those containing dimethylsilyl groups, monomethylsilyl groups, monophenylsilyl groups, diphenylsilyl groups, monopropylsilyl groups, diethylsilyl groups, monovinylsilyl groups, phenylmethylsilyl groups and monoallylsilyl groups. It should also be understood that the compositions of this invention can contain limited amounts of silicon atoms having no hydrocarbon substituents and silicon atoms having 3 hydrocarbon substituents. However, in all cases the average degree of substitution should be within the above defined range.

After impregnation of the filler, the mixture is allowed to dry and then is cured by heating to consolidate the inorganic filler into a unitary article. In order to cure it is necessary to heat only to 100° to 120° C. If desired, a curing catalyst can be incorporated in the compositions of this invention in order to lower the curing temperature or to improve the mechanical strength of the cured article. For this purpose, the catalysts can be any of the conventional siloxane catalyst employed with silicone resins. These include, for example, metallic salts such as potassium acetate, amine salts, and quaternary ammonium salts. Obviously, for the purpose of this invention, it is desirable that the catalyst be soluble in water. If a strong condensation catalyst is employed, it is desirable not to add it to the solution until shortly before contacting the filler.

The compositions of this invention lend themselves admirably to the impregnation of glass fibers at the time of forming. Thus glass fibers can be taken from the bushing and immediately coated with the aqueous solution of this invention before being wound on to the take-up drum. The resulting fibers can then be formed into ribbons and subsequently molded under heat and pressure into any desired shape.

The articles made by the process of this invention are useful in a wide variety of applications such as in the manufacture of structural members, for electrical insulation and for thermal insulation. The latter use is particularly appropriate for bonded glass fibers in the form of a mat. This can be made by merely spraying the solution of this invention on to glass fibers as they are formed and thereafter curing to consolidate the fibers in mat form.

The following examples are illustrative only and should not be construed as limiting the invention which is properly delineated in the appended claims.

*Example 1*

A mixture of 30 g. of phenyltrimethoxysilane, 20 g. of dimethyldimethoxysilane and 20 g. of monomethyl trimethoxysilane was added to 70 g. of distilled water containing .1 percent by weight acetic acid. The mixture was shaken until a single phase formed. (When the water and methanol are removed from the mixture under vacuum at room temperature, the residue is a mixture of silanols and siloxanols which are insoluble in toluene.)

Four sheets of alpha-cellulose paper were impregnated with this solution, air dried and then stacked and molded at 400 p.s.i. at 130° C. for one hour. The resulting laminate contained 30 to 35 percent by weight siloxane based on the weight of the filler. The laminate was then baked one hour at 150° C.

The resulting product was 45 mils thick and had a dielectric strength in excess of 400 volts per mil. It could easily be cut and punched and the paper was throughly wet by the siloxane. These properties were obtained without the use of a condensation catalyst.

*Example 2*

4.31 g. of monopropyltrimethoxysilane was mixed with 10 g. of water containing .1 percent by weight acetic acid. The mixture was shaken until a homogeneous solution was obtained which contained 25 percent by weight organosilicon solids.

50 g. of aluminum oxide was mixed with the solution and the slurry shaped into a disc. The disc was air dried to give a 5 percent by weight pick-up of siloxane on the alumina. The resulting article was heated 2 hours at 105° C. to give a strong well consolidated article.

*Example 3*

A mixture of 20 g. of monomethyltrimethoxysilane, 20 g. of dimethyldimethoxysilane, 40 g. of monophenyltrimethoxysilane, and 5 g. of phenylmethyldimethoxysilane was mixed with 85 g. of distilled water containing .1 percent by weight acetic acid.

This solution was sprayed onto clean glass fibers. The fibers were then allowed to dry and the resulting article contained 20 percent by weight siloxane based on the weight of the glass. The dried glass fibers were compressed into a mat about two inches thick and cured 3 hours at 150° C. The resulting mat was firmly bonded into a unitary article and showed a high degree of resilience. The flexibility and resilience of the mat was maintained after heating at 250° and 300° C.

*Example 4*

The solution of Example 3 was employed to impregnate a sheet of integrated mica approximately 50 mils thick. The impregnated sheet was placed in a press and heated slowly to remove the water and methanol. After removal of the solvent, the impregnated sheet was heated at 175° C. for 30 minutes.

The silicone bonded sheet was found to have a dielectric strength greater than 500 volts per mil. The siloxane pick-up was 12 percent based on the weight of the mica.

Example 5

When a mixture of 96 g. of dimethyldimethoxysilane and 25.6 g. of phenyltrimethoxysilane is shaken with 100 g. of a solution of .1 percent by weight of propionic acid in distilled water until a homogeneous solution is obtained and the resulting solution is mixed with flake glass in amount so that the glass picks up 25 percent by weight siloxane and the resulting mixture is air dried and molded under pressure at 125° C. for 4 hours, a consolidated laminate is obtained.

Example 6

Excellent dielectric strength and arc resistance is obtained when asbestos is substituted for the mica in Example 4.

That which is claimed is:

1. A method of preparing an article of manufacture which comprises (1) contacting a filler with an aqueous solution of an organosilicon composition of the group consisting of silanols and siloxanols, which organosilicon composition is in such a state of molecular aggregation that it is insoluble in toluene but soluble in water and mixtures of water and water-miscible organic liquids, and in which organosilicon composition there is an average of from .9 to 1.9 silicon bonded hydrocarbon radicals per Si atom said radicals being selected from the group consisting of phenyl and aliphatic hydrocarbon radicals of less than 4 carbon atoms, in amount such that the filler picks up at least 1.5 percent by weight organosilicon composition based on the weight of the filler, and (2) thereafter curing the organosilicon composition to consolidate the filler.

2. A method of preparing a molded article which comprises contacting a fibrous material with an aqueous solution of an organosilicon composition of the group consisting of silanols and siloxanols which organosilicon composition is insoluble in toluene but soluble in water and mixtures of water and water-miscible organic liquids, and in which organosilicon composition there is an average of from .9 to 1.9 silicon bonded hydrocarbon radicals per Si atom said radicals being selected from the group consisting of phenyl and aliphatic hydrocarbon radicals of less than 4 carbon atoms, in amount such that the fibrous material picks up at least 1.5 percent by weight of the organosilicon composition based on the weight of the fibrous material, and thereafter subjecting the fibrous material to heat and pressure to cure the resin and consolidate the article.

3. The method in accordance with claim 1 wherein the filler is glass flake.

4. The method in accordance with claim 1, wherein the filler is mica.

5. The method in accordance with claim 2, wherein the filler is fiber glass.

6. The method in accordance with claim 2, wherein the filler is asbestos.

7. A method of preparing an article of manufacture which comprises (1) mixing methoxysilanes of the formula $R_nSi(OMe)_{4-n}$ in which $n$ has an average value of from .9 to 1.9 inclusive and R is selected from the group consisting of phenyl radicals and aliphatic hydrocarbon radicals of less than 4 carbon atoms with more than one mol of water per mol of silane methoxy groups, whereby a homogeneous solution of methanol, organosilicon compound so formed and water is formed, (2) contacting a filler with said solution in amount so that after removal of solvent there is at least 1.5 percent by weight organosilicon compound on the filler based on the weight of the filler, and (3) heating said filler to cure the organosilicon compound and to form a consolidated article.

References Cited by the Examiner

UNITED STATES PATENTS

| | | | |
|---|---|---|---|
| 2,615,861 | 10/52 | Peyrot et al. | 260—37 |
| 2,652,385 | 9/53 | Hunter et al. | 260—45.5 |
| 2,658,881 | 11/53 | Hirsch | 260—37 |
| 2,676,948 | 4/54 | Rowley | 260—37 |
| 2,827,474 | 3/58 | Kress | 260—448.2 |
| 2,832,794 | 4/58 | Gorden | 260—448.2 |
| 2,840,087 | 6/58 | Hersh | 260—29.2 |
| 2,957,839 | 10/60 | Johnson et al. | 260—29.2 |
| 3,046,242 | 7/62 | Santelli | 260—29.2 |

MORRIS LIEBMAN, *Primary Examiner.*

ABRAHAM RIMENS, ALPHONSO D. SULLIVAN, ALEXANDER H. BRODMERKEL, *Examiners.*